US009798740B2

(12) United States Patent
Pfeifle

(10) Patent No.: US 9,798,740 B2
(45) Date of Patent: Oct. 24, 2017

(54) UPDATES FOR NAVIGATIONAL MAP DATA ORGANIZED IN LISTS

(71) Applicant: HERE Global B.V., Veldhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 230 days.

(21) Appl. No.: 14/584,818

(22) Filed: Dec. 29, 2014

(65) Prior Publication Data

US 2016/0188641 A1 Jun. 30, 2016

(51) Int. Cl.
*G06F 17/30* (2006.01)
*G06F 9/44* (2006.01)

(52) U.S. Cl.
CPC .. *G06F 17/30241* (2013.01); *G06F 17/30318* (2013.01); *G06F 17/30374* (2013.01); *G06F 17/30377* (2013.01); *G06F 8/68* (2013.01)

(58) Field of Classification Search
CPC ............... G06F 17/30241; G06F 8/68; G06F 17/30318; G06F 17/30374; G06F 17/30377
USPC ........................................................ 707/756
See application file for complete search history.

(56) References Cited

U.S. PATENT DOCUMENTS

| | | | |
|---|---|---|---|
| 5,502,640 A | | 3/1996 | Yagyu et al. |
| 5,678,043 A | * | 10/1997 | Ng ..................... G06F 17/30595 341/106 |
| 5,845,228 A | | 12/1998 | Uekawa et al. |
| 5,857,203 A | * | 1/1999 | Kauffman ......... G06F 17/30955 |
| 6,065,013 A | * | 5/2000 | Fuh .................... G06F 17/30607 |
| 6,084,734 A | * | 7/2000 | Southerland .......... G11B 20/18 360/25 |
| 6,230,098 B1 | * | 5/2001 | Ando .................... G01C 21/32 340/990 |
| 6,260,042 B1 | | 7/2001 | Curbera et al. |
| 6,327,259 B1 | * | 12/2001 | Chiu ..................... G06F 13/372 370/375 |
| 6,473,770 B1 | | 10/2002 | Livshutz et al. |
| 6,615,219 B1 | | 9/2003 | Bruso et al. |
| 6,671,757 B1 | * | 12/2003 | Cash ................... H04L 67/1095 707/999.201 |
| 6,741,929 B1 | | 5/2004 | Oh et al. |

(Continued)

FOREIGN PATENT DOCUMENTS

| | | | | |
|---|---|---|---|---|
| EP | 2339481 | | 6/2011 | |
| GB | 2351167 | | 12/2000 | |
| JP | WO 2010007690 A1 | * | 1/2010 | .............. G01C 21/32 |

OTHER PUBLICATIONS

European Search Report for related European Application No. 15202376.8 dated May 18, 2016, with English Translation.

(Continued)

*Primary Examiner* — Phuong Thao Cao
(74) *Attorney, Agent, or Firm* — Alston & Bird LLP

(57) ABSTRACT

A geographic database may include binary data including list portions and/or non-list portions. A computing device may identify a list in a first binary large object (BLOB) for navigation data including road segments and road attributes. The first BLOB is segmented based on the byte list portion into a plurality of elements each having a predetermined size. The computing device may define a series of operations for the multiple elements to transform the first BLOB to a second BLOB.

18 Claims, 13 Drawing Sheets

(56) References Cited

U.S. PATENT DOCUMENTS

| | | | |
|---|---|---|---|
| 7,046,174 B1* | 5/2006 | Lui | H03K 5/135 |
| | | | 341/100 |
| 7,957,894 B2 | 6/2011 | Wellmann | |
| 8,285,693 B2* | 10/2012 | Mahajan | G06F 17/30575 |
| | | | 463/1 |
| 8,346,788 B1* | 1/2013 | Kim | G06F 17/30286 |
| | | | 707/756 |
| 8,572,033 B2 | 10/2013 | Shukla | |
| 8,626,704 B2* | 1/2014 | Sawai | G01C 21/32 |
| | | | 707/602 |
| 8,856,089 B1* | 10/2014 | Briggs | G06F 17/30351 |
| | | | 707/695 |
| 8,924,631 B2* | 12/2014 | Ng | G06F 12/0246 |
| | | | 711/103 |
| 9,015,200 B2* | 4/2015 | Pfeifle | G06F 17/30318 |
| | | | 707/795 |
| 9,053,107 B1* | 6/2015 | Le | G06F 17/30174 |
| 2001/0044805 A1* | 11/2001 | Multer | G06F 17/30194 |
| 2004/0135705 A1 | 7/2004 | Umezu et al. | |
| 2004/0193370 A1* | 9/2004 | Umezu | G01C 21/32 |
| | | | 701/450 |
| 2005/0010870 A1 | 1/2005 | Gu et al. | |
| 2005/0099963 A1* | 5/2005 | Multer | G06F 17/30174 |
| | | | 370/254 |
| 2005/0132179 A1* | 6/2005 | Glaum | G06F 11/1433 |
| | | | 713/1 |
| 2005/0132244 A1* | 6/2005 | Milway | G06F 13/28 |
| | | | 713/400 |
| 2005/0216906 A1* | 9/2005 | Shahindoust | H04L 63/20 |
| | | | 717/171 |
| 2006/0039618 A1* | 2/2006 | Ogle | G06F 8/68 |
| | | | 382/236 |
| 2006/0072625 A1* | 4/2006 | Shearer | G06F 13/4282 |
| | | | 370/503 |
| 2006/0136459 A1* | 6/2006 | Trinon | G06F 9/542 |
| 2006/0190507 A1* | 8/2006 | Sekine | G01C 21/32 |
| 2006/0282457 A1* | 12/2006 | Williams | H03M 7/30 |
| 2007/0129885 A1 | 6/2007 | Wellmann | |
| 2008/0040401 A1* | 2/2008 | Reinsch | G06F 8/68 |
| 2008/0109443 A1 | 5/2008 | Tokui et al. | |
| 2008/0163189 A1* | 7/2008 | Chen | G06F 8/68 |
| | | | 717/168 |
| 2008/0201070 A1 | 8/2008 | Kikuchi | |
| 2008/0294657 A1* | 11/2008 | Leung | G06F 17/30011 |
| 2008/0313244 A1* | 12/2008 | Ito | G06F 17/30377 |
| 2009/0030606 A1 | 1/2009 | Pfeifle et al. | |
| 2009/0037694 A1* | 2/2009 | Luick | G06F 9/30018 |
| | | | 712/204 |
| 2009/0138870 A1* | 5/2009 | Shahindoust | G06F 8/65 |
| | | | 717/172 |
| 2009/0276771 A1 | 11/2009 | Nickolov et al. | |
| 2010/0169875 A1* | 7/2010 | Stewart | G06F 8/65 |
| | | | 717/170 |
| 2010/0312757 A1* | 12/2010 | Meschenmoser | G01C 21/32 |
| | | | 707/695 |
| 2011/0055155 A1* | 3/2011 | Page | G06F 8/68 |
| | | | 707/625 |
| 2011/0173601 A1* | 7/2011 | De Los Reyes | G06F 8/68 |
| | | | 717/169 |
| 2011/0196833 A1* | 8/2011 | Drobychev | G06F 17/30575 |
| | | | 707/634 |
| 2011/0196890 A1* | 8/2011 | Pfeifle | G06F 17/30241 |
| | | | 707/769 |
| 2012/0011178 A1* | 1/2012 | Pfeifle | G06F 17/30318 |
| | | | 707/825 |
| 2012/0036150 A1* | 2/2012 | Richter | G01C 21/32 |
| | | | 707/769 |
| 2012/0209818 A1* | 8/2012 | Richter | G06F 17/30371 |
| | | | 707/690 |
| 2013/0006925 A1* | 1/2013 | Sawai | G06F 17/30241 |
| | | | 707/609 |
| 2013/0013557 A1* | 1/2013 | Kunath | G01C 21/32 |
| | | | 707/609 |
| 2013/0073784 A1* | 3/2013 | Ng | G06F 12/0246 |
| | | | 711/103 |
| 2013/0111458 A1* | 5/2013 | Quin | G06F 8/68 |
| | | | 717/172 |
| 2013/0132398 A1* | 5/2013 | Pfeifle | G06F 17/30241 |
| | | | 707/745 |
| 2013/0138615 A1* | 5/2013 | Gupta | G06F 17/30174 |
| | | | 707/690 |
| 2013/0159974 A1 | 6/2013 | Norton et al. | |
| 2013/0272565 A1* | 10/2013 | Fagundes | H04M 3/523 |
| | | | 382/100 |
| 2014/0033188 A1* | 1/2014 | Beavers | G06F 8/65 |
| | | | 717/170 |
| 2014/0101096 A1* | 4/2014 | Pfeifle | G06F 17/30575 |
| | | | 707/609 |
| 2014/0108462 A1* | 4/2014 | Pfeifle | G06F 17/30318 |
| | | | 707/795 |
| 2014/0164409 A1* | 6/2014 | Johnson | G06F 17/30377 |
| | | | 707/756 |
| 2014/0188386 A1* | 7/2014 | Obara | G01C 21/32 |
| | | | 701/532 |
| 2014/0304697 A1* | 10/2014 | Lin | G06F 8/68 |
| | | | 717/170 |
| 2015/0178105 A1* | 6/2015 | Graham | G06F 8/68 |
| | | | 718/1 |
| 2017/0177631 A1* | 6/2017 | Page | G06F 17/30309 |

OTHER PUBLICATIONS

Miklos Ajtai et al: "Compactly Encoding Unstructured Inputs with Differential Compression", Journal of the Association for Computing Machinery, ACM, New York, NY, US, vol. 49, No. 3, May 1, 2002, pp. 318-367, ISSN: 0004-5411, DOI: 10.1145/567112.567116, pp. 319, 357, 2002.

Randall Hyde: "The Art of Assembly Language, 2nd Edition, Chapter 10", Mar. 25, 2010, No Starch Press, San Francisco, XP055267948, ISBN: 978-1-59327-207-4, pp. 599-631, 2010.

Randall Hyde: "The Art of Assembly Language, 2nd Edition, Chapter 3", Mar. 25, 2010, No Starch Press, San Francisco, XP055267948, ISBN: 978-1-59327-207-4, pp. 111-153, 2010.

Chawathe et al., Change Detection in Hierarchically Structured Information, Accessed Aug. 17, 2013, Department of Computer Science, Stanford University.

International Search Report and Written Opinion cited in PCT/EP2013/070792, dated Jan. 8, 2014.

U.S. Appl. No. 13/302,000, filed Nov. 22, 2011.

Wellmann, Route Search with Tile-Generated Rank, Power Point presentation, Febraury 1, 2006, 53 pages, Harman/Becker.

European Office Action for related European Application No. 15 202 376.8 dated May 12, 2017.

* cited by examiner

UPDATES FOR NAVIGATIONAL MAP DATA ORGANIZED IN LISTS

FIELD

The following disclosure relates to map updates, and more particularly to map updates of a geographic database using scripts.

BACKGROUND

Map databases are used in computer-based systems that provide useful features to users. For example, the identification of routes to destinations or points of interests. A navigation system determines the optimum route to be taken by the end user to travel from the origin to the destination location from map data stored in a geographic (or map) database. Map databases are also used in advanced driver assistance systems, such as curve warning systems, adaptive cruise control systems and headlight aiming systems. Map databases are also used in systems that improve vehicle fuel economy, such as systems that optimize transmission gear selection taking into account upcoming slope and speed changes.

As new roads are built, other roads are closed, or locations of business are changed, the geographic database is updated. One way to update map data is to replace the entire existing map database with a new version of the geographic database containing new, updated map data.

However, a replacement of the entire map database is a relatively expensive and time consuming process and may be unnecessary considering that much of the map data may not be changed from the old version to the new version. Further, wholesale map updates in mobile devices introduce challenges because bandwidth is often limited and map updates are often bulky and require high bandwidth.

SUMMARY

In one embodiment, a method includes identifying, using a processor, a list portion in a first binary large object (BLOB) for navigation data including road segments, road attributes, or map polygons, segmenting, in response to the list portion, the first BLOB into a plurality of elements each having a predetermined size, and defining a series of operations for the plurality of elements to transform the first BLOB to a second BLOB.

In one embodiment, a computing device is configured to identify a list portion in a first binary large object (BLOB) for navigation data include road segments and road attributes, divide the first BLOB into a plurality of elements each having a predetermined size, and define a series of operations for the plurality of elements to transform the first BLOB to a second BLOB.

In one embodiment, a computing device is configured to identify one or more lists in a first portion of a binary large object (BLOB) for navigation data including, map polygons, road segments or road attributes, identify a second portion of the BLOB, divide the first portion of the BLOB into a plurality of elements each having a predetermined size, perform a binary difference operation on the second portion of the BLOB, define a series of operations for the plurality of elements to update the BLOB, and generate an update script including a result of the binary difference operation and the series of operations.

BRIEF DESCRIPTION OF THE DRAWINGS

Exemplary embodiments of the present invention are described herein with reference to the following drawings.

DETAILED DESCRIPTION

Significant efforts have been directed toward update techniques for navigation databased on embedded devices, including mobile phones or head units in vehicles. As the amount of navigation related content and features on these devices increases, so does the size of the database. As a consequence, the update scripts for keeping the databases up to date with changes in locations, points of interests, and road network have been increasing in size. A lot of data is organized in BLOBs (binary large objects) such as routing or basic map display data. The content of these BLOBs may include "metadata" and "payload" data which is often organized in lists.

Figure 1:
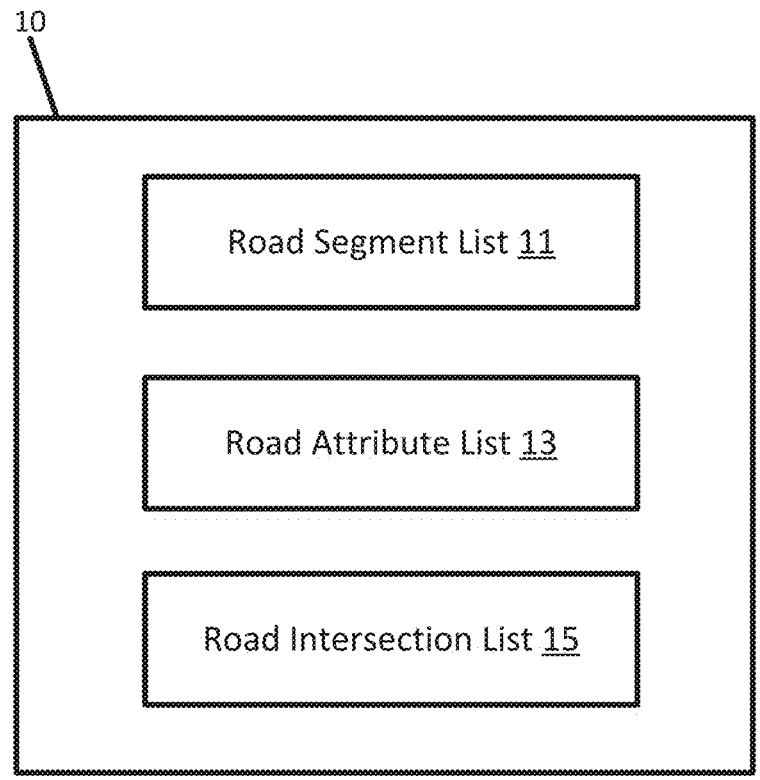
FIG. 1. illustrates an example map tile.

FIG. 1 illustrates a BLOB structure 10 for the main routing function of a navigation database, which may be referred to as the routing tile. The routing tile includes metadata and payload. As illustrates, the metadata includes the routing tile header and the payload includes various list structures such as road segment list 11, road attribute list 13, and road intersection list 15.

The lists may be various sizes. The basic map display may also include many area, line, and point lists. The road attributes 13 may include properties such as functional classification, speed limit, slope, number of lanes, or other attributes. The lists may include road segment identifiers and an array of attributes for road segment. Additional, different, or fewer lists may be included in the BLOB structure 10.

In the navigation database, some of the data may be byte aligned. That is, the number of bits is divisible by a power of 2 that is 8 or greater such that an integer number of bytes are used. Other data may be not byte aligned (byte misaligned). One example is the is an attribute for the type of link that includes only 6 bits, resulting in link objects that occupy n bytes and m bits, with m being between 0 and 7. For example, when four 6-bit objects are used, the 24 total bits span 3 bytes. The LinkSector may provide a coarse direction for the direction of a road segment. The direction may be described a 6 bit number from 0 to 64 that are counted clockwise with sector 9 indicative of a North direction.

Another example of binary encoding may be a basic map display. The core of the basic may display may include 6 bits followed by a list of polygon points. Each of the polygon points describes a location where for each point encoded with a certain number of bits, which may be unequal to 8 or 16 bits. The anchor point may be listed followed by a value describing the number of bits excluding the sign bit. Next, an edge indicator that determines whether the edge for the vertex is a pseudo edge that may have resulted from clipping or triangulation. Finally, the remaining vertices are listed.

Replacing the entire navigation database during an update requires significant bandwidth and time. Instead, an update script may be used so that only the changes are sent from the map developer to the embedded device. One technique for identifying the changes is a binary difference. The binary different calculates the difference between two bit strings. The binary difference compares the first bit in one string to the first bit of the other string and so forth.

This may be illustrated using two example bit strings and the hexadecimal representation. Consider bit string A below having 8-bit bytes indicated by alternating underline and not under line and 6-bit objects indicated by alternating bold and not bold.

1011001100001110001110000001100100100110000111001
01000111111000110000010000100001
0000010000100111

Bit string A may be represented in hexadecimal by B30E3819243947E304210427

A new 6-bit object "110011" is inserted at position 2 of the list (becoming the second 6-bit object in the bit string), to form bit string B below:
10110011001111000011100011100000011001001010010000
111001010001111110001100000010000
10000100000100001100111

The hexadecimal representation of the bit string B would be would be B33C38E06490E51F8C1084109C.

The two hexadecimal representations differ greatly. Rather than a change to 1 byte and shifting values by one byte, all bytes have been altered. Reproduced for comparison are the hexadecimal representations of strings A and B.

String A: B30E3819243947E304210427 (before inserting)

String B: B33C38E06490E51F8C1084109C (after inserting)

The hexadecimal representations are quite different. Because the objects are 6 bits in length, and bytes are 8 bits in length, objects overlap bytes. Thus, most or every value after the insertion has changed. Performing a binary difference on strings A and B results in a large difference. Describing an update to a navigation database using binary difference in the example would be high cost. If you a navigational database including BLOBs, a straightforward binary difference of the old and new BLOB may lead to a rather large update package, even in the instance that only one element is inserted or deleted.

The following embodiments describe examples for an incremental update for a navigational database includes BLOBs with lists of objects. Rather than the binary difference, the update script includes a series of commands for manipulate the data on an object basis. In one example, the objects may have any number of bit lengths. In one example, the objects may have any number of bit lengths that is not divisible by 8 or a greater power of 2.

Figure 2:
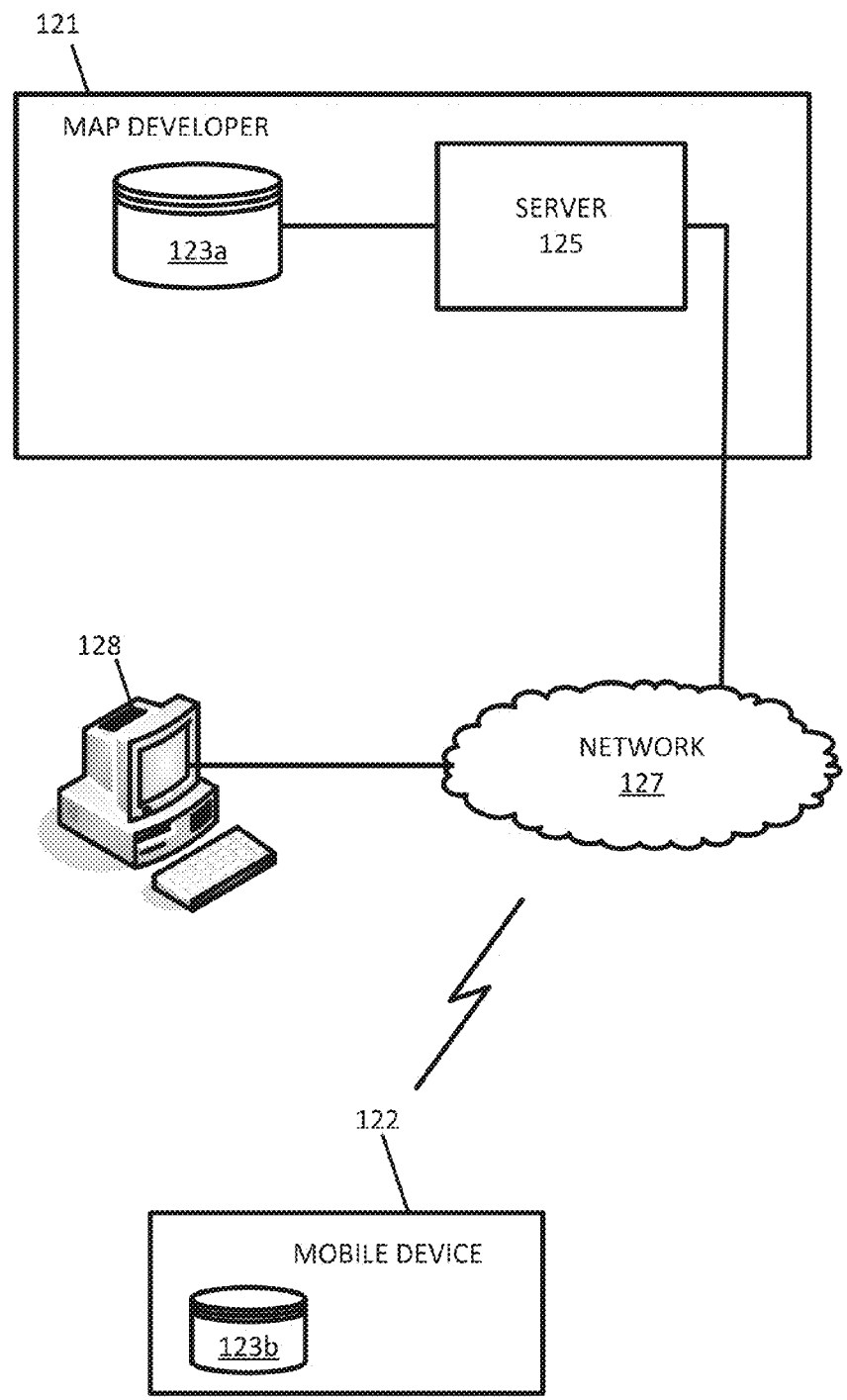
FIG. 2 illustrates an example map developer system.

FIG. 2 illustrates an example map developer system 120 for obtaining navigation databases. The system 120 includes a developer system 121, one or more mobile devices 122 (navigation devices), a workstation 128, and a network 127. Additional, different, or fewer components may be provided.

For example, many mobile devices 122 and/or workstations 128 connect with the network 127. The developer system 121 includes a server 125 and one or more databases. The database 123a-b may be a geographic database including road links or segments. As shown in FIG. 2, a master copy of the database 123a may be stored at the developer system 121, and a local copy of the database 123b may be stored at the mobile device 122. In one example, the local copy of the database 123b is a full copy of the geographic database, and in another example, the local copy of the database 123b may be a cached or partial portion of the geographic database. The cached portion may be defined based on a geographic location of the mobile device 122.

The server 125 may send map updates to the mobile device 122. The server 125 may update a particular tile of the geographic database 123. The server 125 may send updates to the master copy of the database 123a and/or send updates to the local copy of the database 123b. The server 125 may identify a list portion from binary data in a first binary object for navigation data including road segments and road attributes. The list portion may include a road attribute list, a node list, an intersection list, a path type list, or other characteristics. One or more of the lists may include objects described using a nonstandard number of bits such as non-modulo 8.

The server 125 may generate an update script for the navigation data. The update script may include instructions based on segments rather than BLOBs. The server 125 is configured to segment the list portion into multiple elements each having a predetermined size. The size may vary from segment to segment. The server 125 may define a series of operations for the multiple elements to transform the BLOB to a second BLOB. The series of operation may insert, remove, or move segments.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing for calculating the vehicle confidence value and the comparison with the confidence threshold. In other embodiments, the mobile device 122 or the workstation 128 performs a majority of the processing. In addition, the processing is divided substantially evenly between the server 125 and the mobile device 122 or workstation 128.

Figure 3:
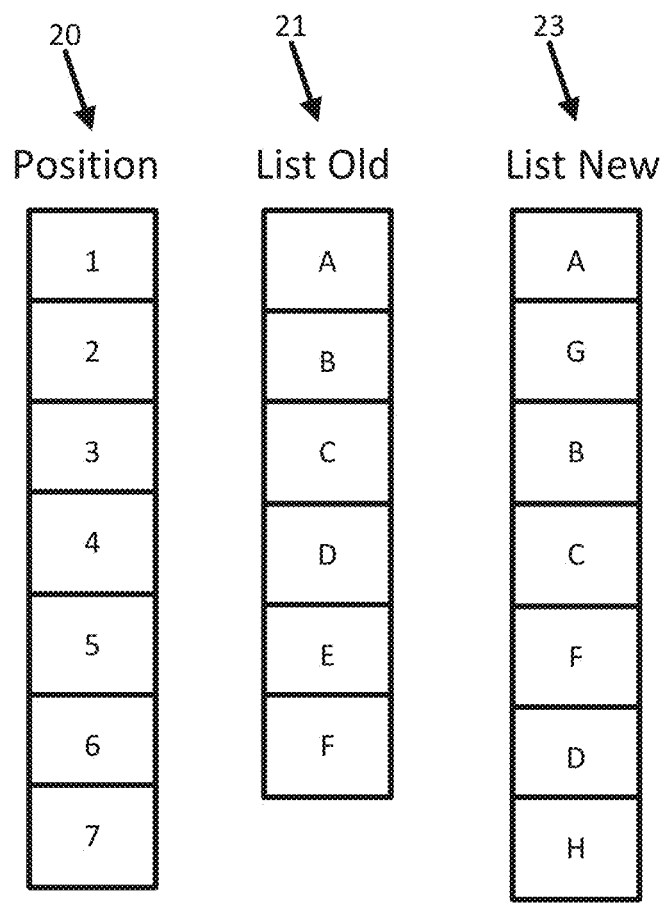
FIG. 3 illustrates an example series of objects for a map tile.

FIG. 3 depicts a position index 20 for labeling positions of an old list 21 of objects and a new list 23 of objects. Both lists include binary objects marked by characters A to H. The binary objects do not need to be byte aligned. That is, the objects may have different numbers of bits and bit lengths that are not equal to a multiple of 8. The positions of the objects is indicated by a number.

Figure 4:
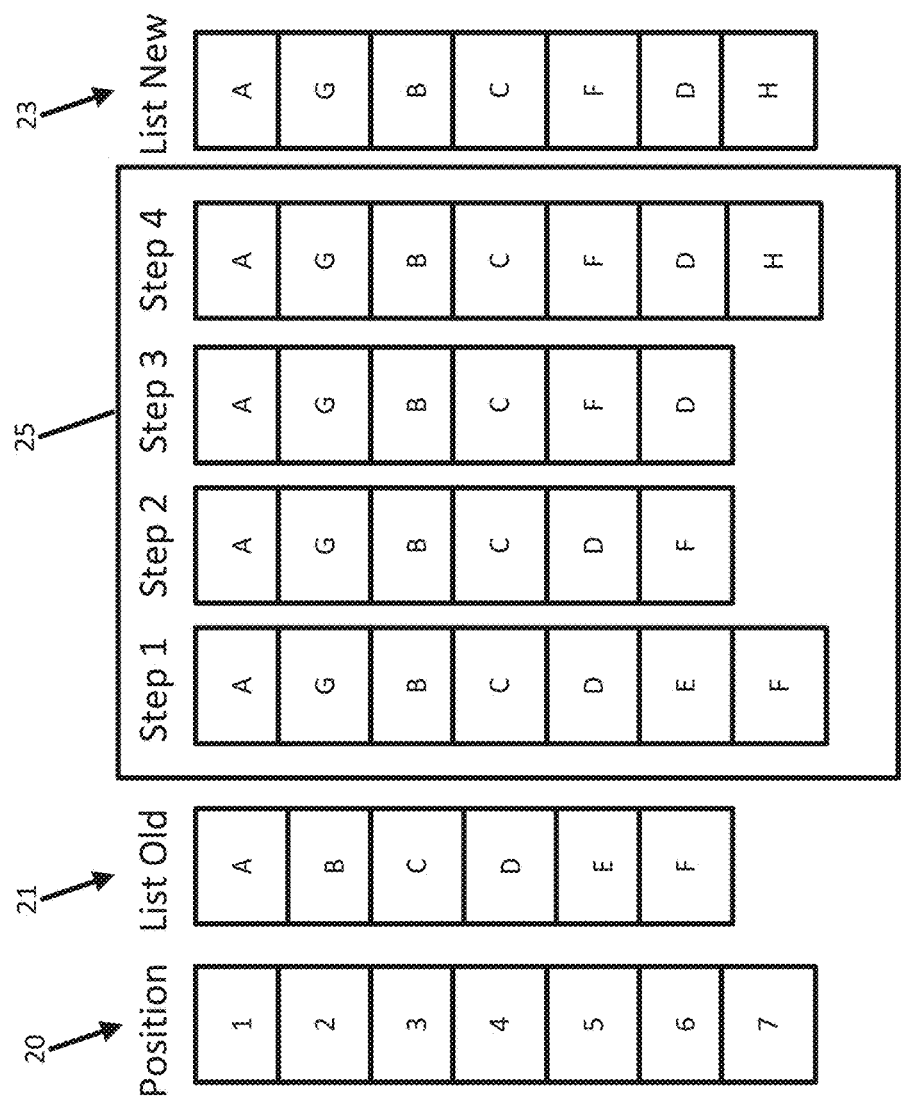
FIG. 4 illustrates a sequence of steps to apply an update to the example series of objects.

FIG. 4 illustrates a sequence of steps 25 to move from the old list 21 to the new list 23 the following steps may be encoded in an update script. In step 1, insert object G at position 2. The data of Object G is part of the update script. The objects B-F shift down a position. In step 2, delete Object E from position 6 (note that Object E is moved to position 6 after object G was inserted). In step 3, move Object F from position 6 to 5 (objects D and F change their position). In step 4, insert Object H at Position 7. The data of Object H is part of the update script.

Thus, the update script includes the data of objects G and H, the new objects, and the instructions for moving, deleting, and adding objects. The instructions include the position numbers and a command (e.g, move, delete, add, or another command). Example instructions include "insert Element O at Position x," "delete Element O at Position x," "move Element O from Position x to y." For insert instructions, the data of the object is in the update script. For delete and move commands only the instruction is included.

One example for the instructions for FIG. 3 may include [insert G at position 2; data of G; delete position 6; move from position 6 to 5; insert H at position 7; data of H]. Thus the amount of data needed includes only the content of G and H, as well as a few simple commands requiring only a few bytes. This is much smaller than the binary difference, which requires almost all of the data of the navigation tile to be sent.

Figure 5:
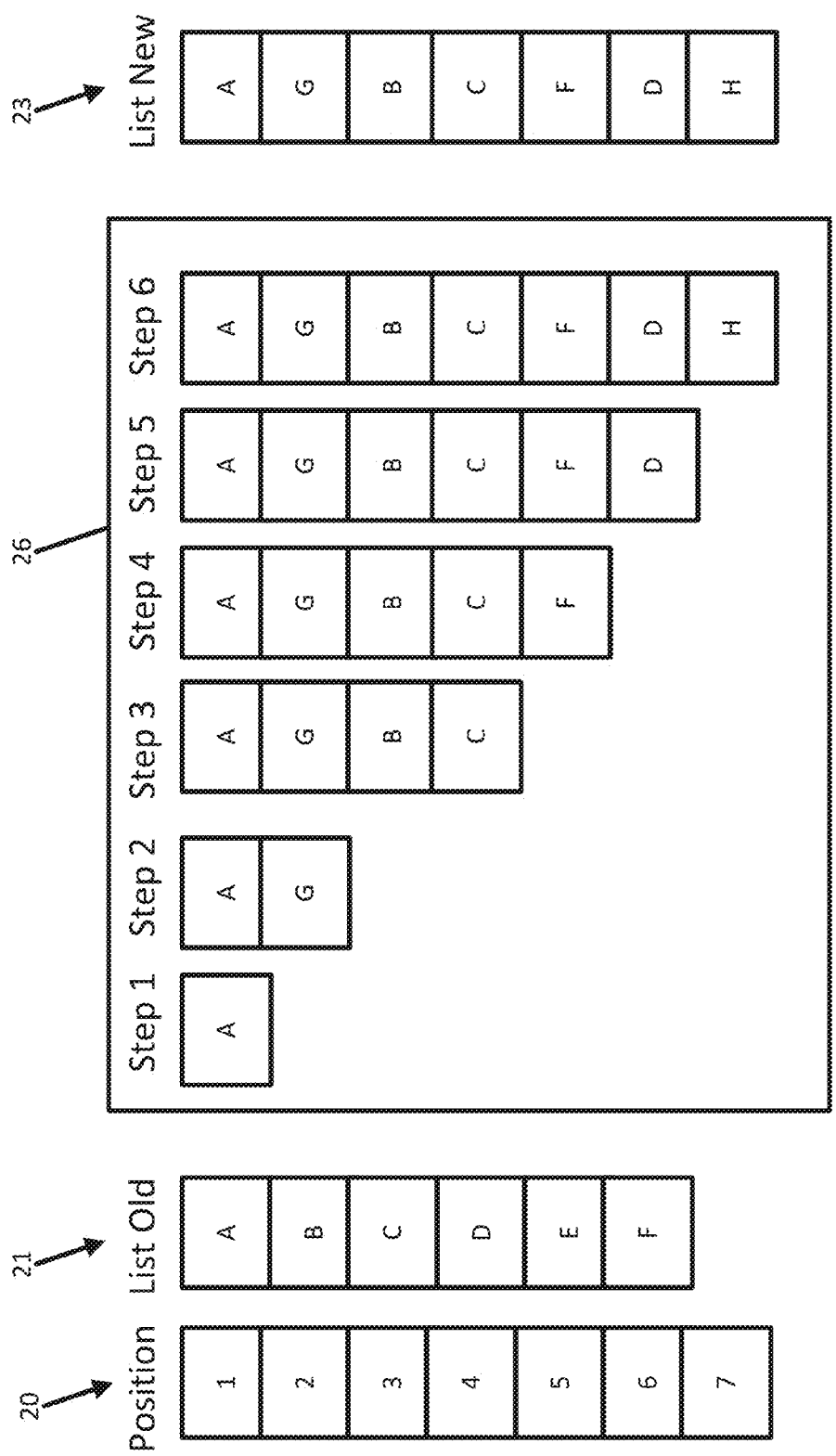
FIG. 5 illustrates a sequence of steps to create the series of objects.

FIG. 5 illustrates another sequence of steps 26 to apply an update to the example series of objects. Each of the objects is added one at time. In step 1 object A is added, and in step 2, object G is added. In step 3 objects B and C are added. Two objects are added in step 3 because the order is preserved for objects B and C between the old list 21 and the new list 23. In step 4, object F is added in a new location. In step 5, object D is added at a new location. In step 6, object H is added.

The update script for the sequence in FIG. 5 may include only add commands. Example formats may include "add Element from position x to y," and "add Element O." The data of the objects are included in the update script. One example for the instructions for FIG. 5 may include [add from position 1 to 1; add new object G; data for G; add from positions 2 and 3 of old list; add from position 6 of old list; add from position 4 of old list; add new object H; data for H].

In some examples, the order of the elements in a list is decisive and defined by the application logic, and sometimes the order of the elements does not matter. For instance, in the link list of a navigation database example, it could be that the links have to be ordered according to their spatial position (e.g. according to the Morton Code of the link center), but in other examples the lists may be stored in any arbitrary order. The Morton Code maps multidimensional data into a single dimensional (e.g., bit string). A z-value of the points in calculated form interleaving the binary representation of the coordinate values.

In the examples in which the order of the elements in the list does not matter, the compiler may reorder the elements of the list in such a way that the update script for this list is minimized. The update script may be limited to insert operations and delete operations. The compiler may first identify the unchanged elements as the beginning of the update script. The compiler may next identify removed elements in a second portion of the update script. The compiler may lastly identify modified elements in a third portion of the update script. In other words, for all elements in the new list which are also available in the old list, the ordering of the old list is maintained, and all new elements are added at the end.

Figure 6:
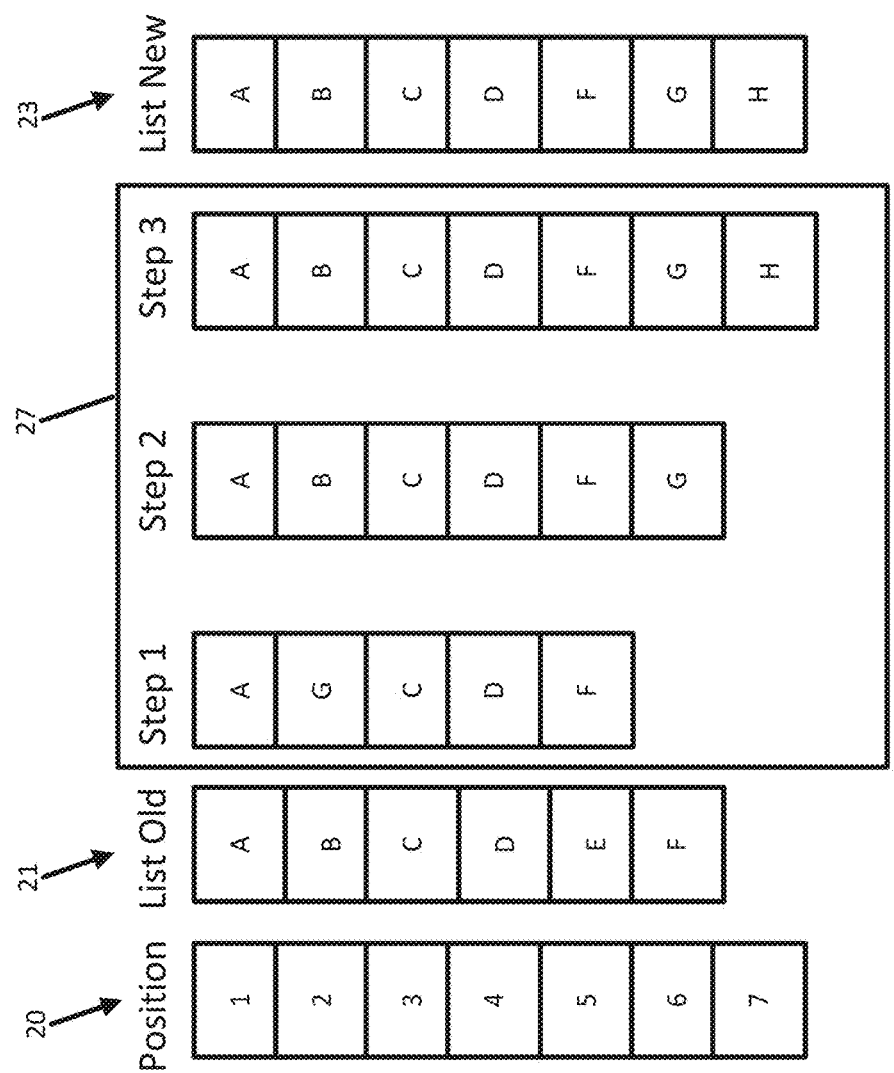
FIG. 6 illustrates another sequence of steps to apply an update to the example series of objects.

FIG. 6 illustrates another sequence of steps 27 to apply an update to the example old list of objects 21 to new list of objects 23. For ease of illustration, the new list of objects 23 is represented in an order closest to the old list of objects 21. Any order may be used because order is not preserved in this example. In step 1, object E is deleted. In step 2, object G is inserted. In step 3, object H is inserted. One example for the update script for FIG. 6 may include [delete object E; insert object G; data for G; insert object H; data for H]. Fewer steps are necessary in this example. The steps of the update script may be arranged in any order.

Figure 7:
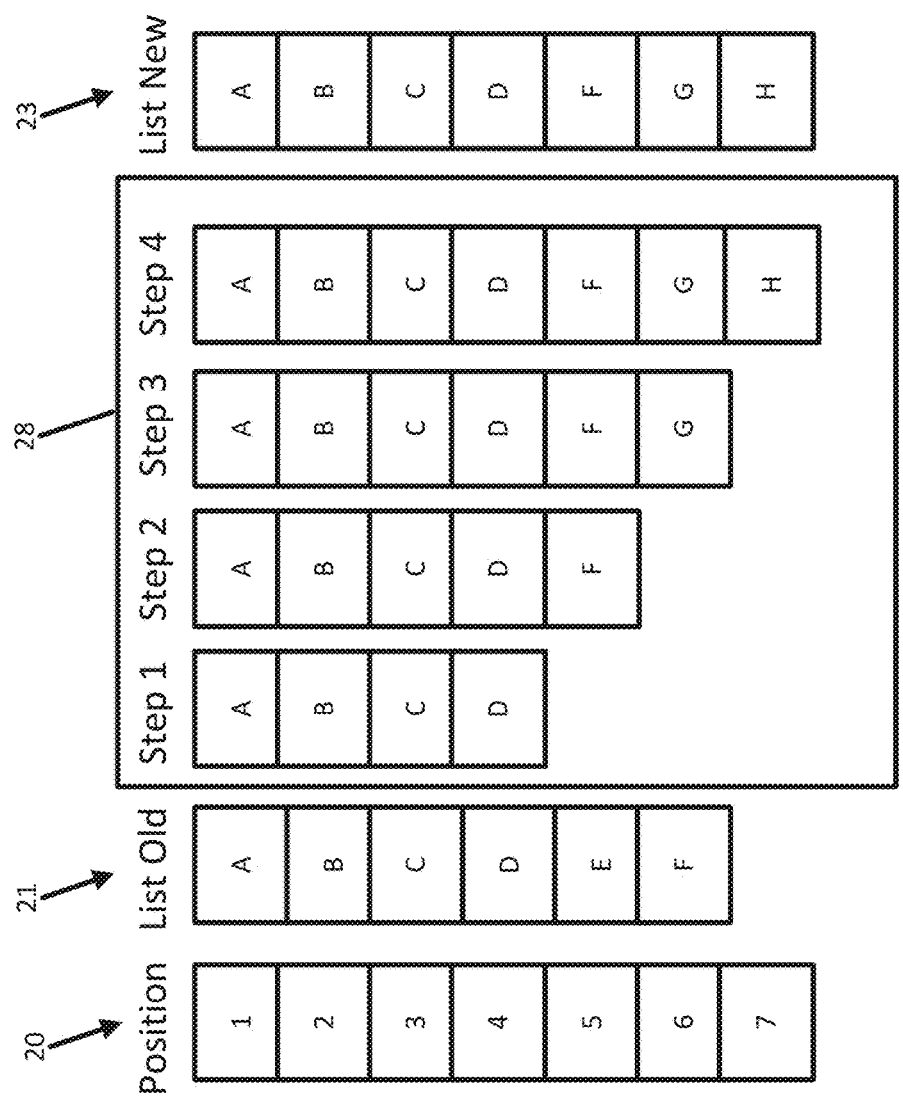
FIG. 7 illustrates another sequence of steps to apply an update to the example series of objects.

FIG. 7 illustrates another sequence of steps to apply an update to the example series of objects. The old list 21 is updated to the new list 23 by the sequence of steps 28. In step 1, objects A, B, C, and D are maintained in the same positions from the old list 21 to the new list 23. In step 2, object F is added. In step 3, object G is added. In step 4, object H is added. One example for the update script for FIG. 5 may include [add elements from position 1 to position 4; add element F from potion 6; add new element G; data from G; add new element H; data from H].

Figure 8:
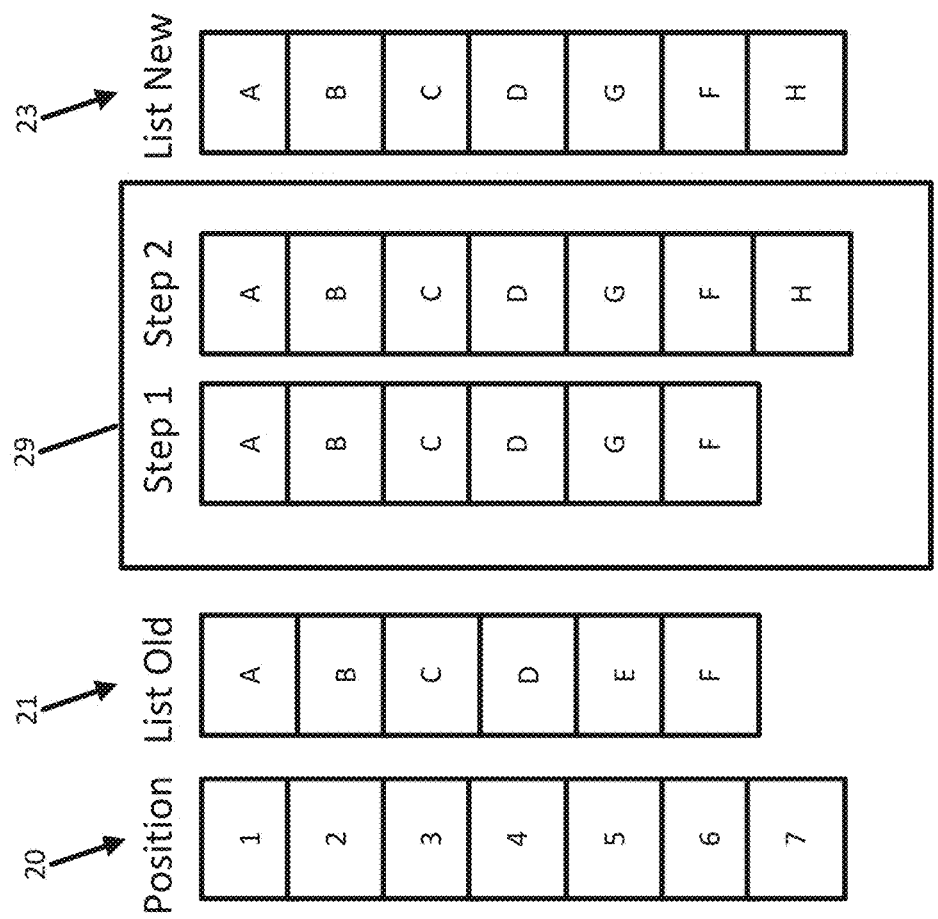
FIG. 8 illustrates another sequence of steps to apply an update to the example series of objects.

FIG. 8 illustrates another sequence of steps to apply an update to the example series of objects. At position 5, object E is deleted and in its place, object G is inserted. The simultaneous deletion and insertion may be provided by a replace or update command. At position 6, object G is added. By extending the command set for modifying an existing list with the replace operation, the number of transformation steps can be reduced even further. The new list is created by keeping the positions of all elements and by replacing deleted elements with new elements.

Figure 9:
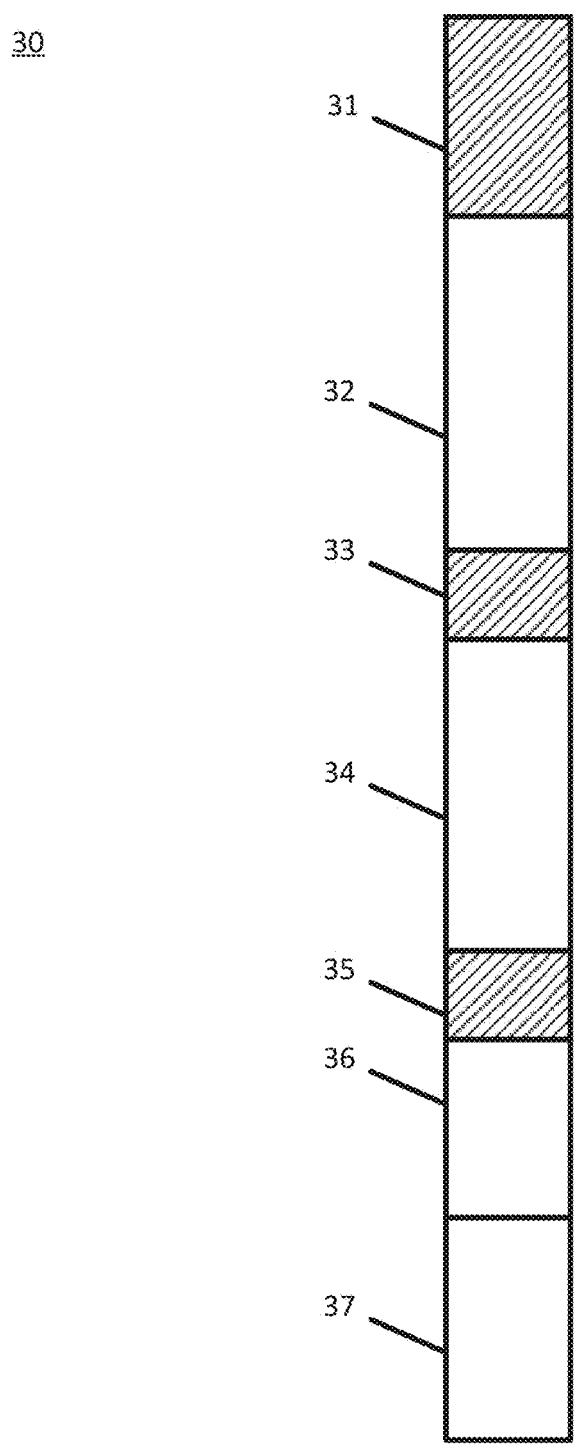
FIG. 9 illustrates an example structure of a map update.

FIG. 9 illustrates an example structure of a map update 30. The data for the map update 30 includes portions 31 through 39. Rather than storing the complete binary information in the overall update script, binary difference data may be used when the binary objects are byte aligned. Portions that are hatched (e.g., portions 31, 33, and 35) represent binary difference data. The other portions (e.g., portions 32, 34, 36, and 37) include the update for portions that are not byte aligned.

The server 125 may analyze the geographic database to identify list portions and non-list portions. Some of the list portions may be byte aligned and other portions of the list portion may be byte misaligned. In addition, the non-list portion may include data that is byte aligned and data that is not byte aligned. The server may perform a first algorithm on the byte aligned portion (e.g., binary difference) and a second algorithm on the non-byte aligned portion. The second algorithm may involve segmenting the date into predetermined sizes and identifying update operations for the segment. The map update script may combine the binary difference data, segment update operations, and BLOB data for new segments that are added.

Figure 10:
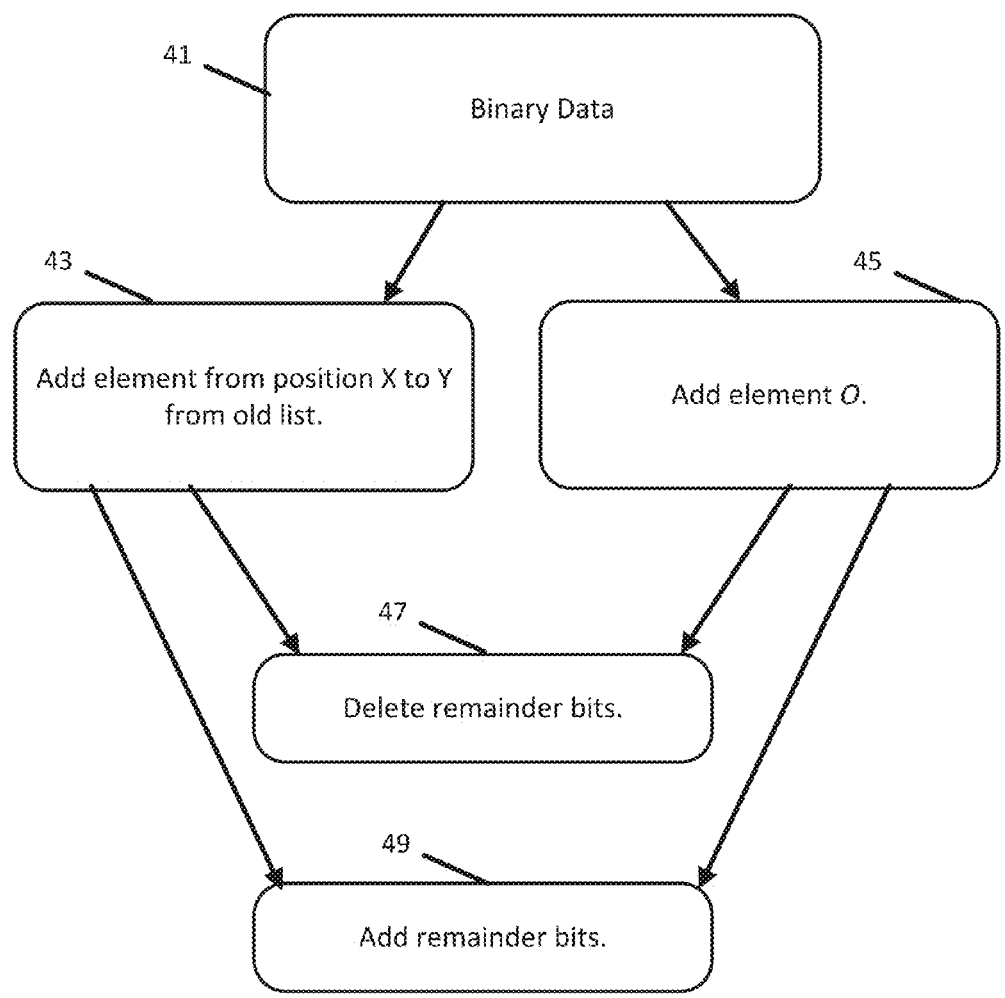
FIG. 10 illustrates an example flowchart for map updates.

FIG. 10 illustrates an example flowchart for map updates. At stage 41, the binary data is analyzed to determine whether lists are included. From the lists, update sequences are derived. The update sequences include modifications 43 and additions 45. The modifications 43 may include adding and element at position X in the new list from position Y in the old list. The additions 46 include new data that is added to the list from the update script. Because some of the data is not byte aligned, the resulting update script will also not have a number of bits divisible by 8. Dummy bits or remainder may be added, as shown by stage 49. The added bits may bring the total number of bits into multiple of 8.

Alternatively, some bits may be deleted as shown by stage 47. Bits are deleted from an initial binary block (e.g., a header) that includes a nonstandard number of bits. The bits are deleted so that a subsequent list portion may be stored without any empty space between the initial binary block and the list portion.

The number of bits added or deleted is between 1 and 7, inclusive. In one example, the flowchart for map updates includes additional update operations. The update operations may include an insertion of element O at position X, a deletion of element O at position X, a movement of element O from position X to position Y, and an update of element O at position X.

The geographic database may include road segments or links. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data includes a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the mobile device 122, or at an external location.

The mobile device 122 is configured to execute routing algorithms to determine an optimum route to travel along a road network from an origin location to a destination location in a geographic region. Using input from the end user, the navigation device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 is also configured to execute the update script on local map data. The navigation device 122 receives an update script from the server 125 by way of network 127. The update script includes less data than a wholesale replacement of a portion of the database or BLOB and requires less bandwidth and/or transmission time than the portion of the database or BLOB. The update script may be stored in a computer readable medium coupled to the server 125 or the navigation device 122. The navigation device updates BLOBs in the local map data through the update commands included in the update script, as described in the examples below.

Figure 11:
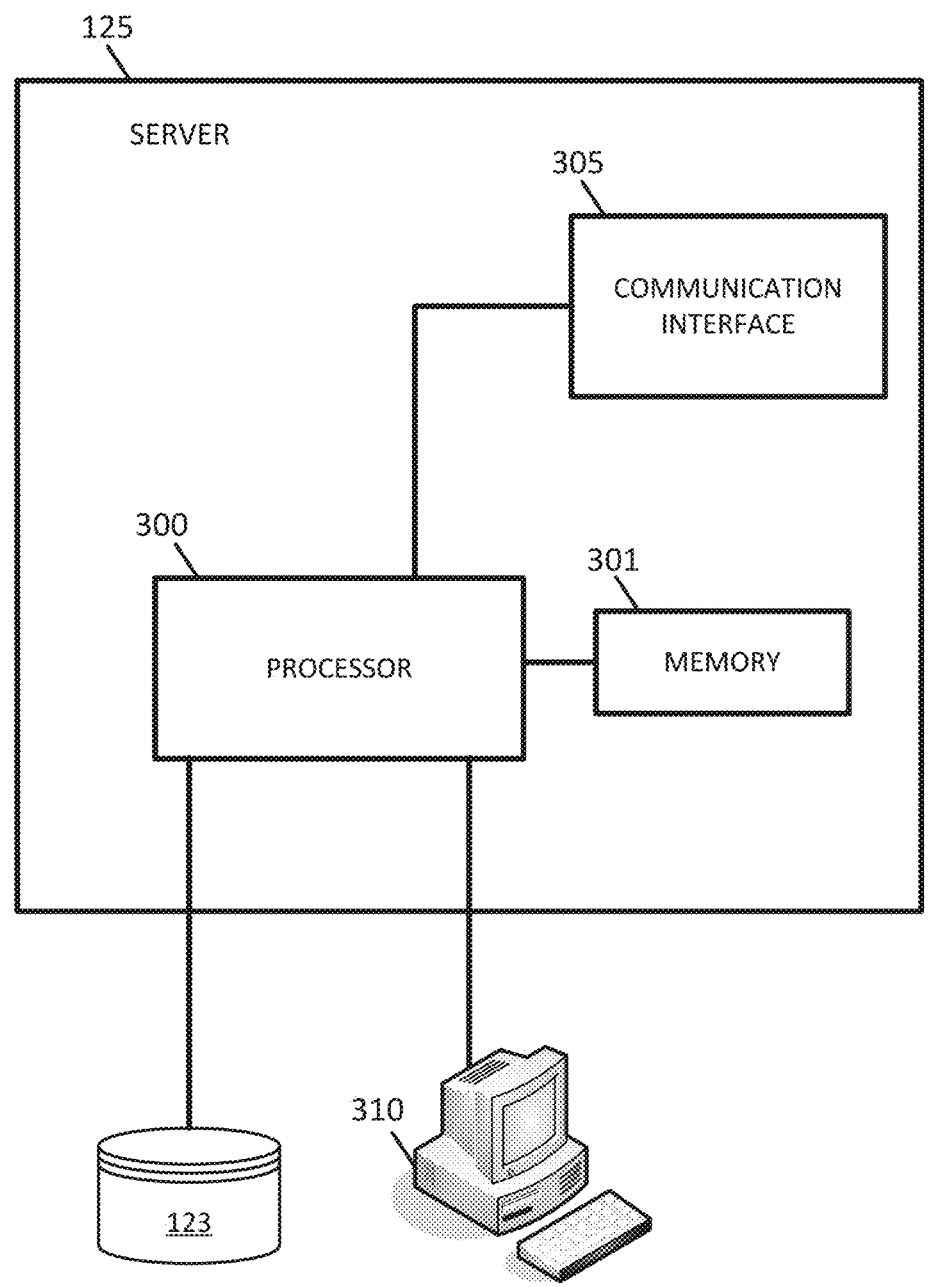
FIG. 11 illustrates an example server of the map developer system.
Figure 12:
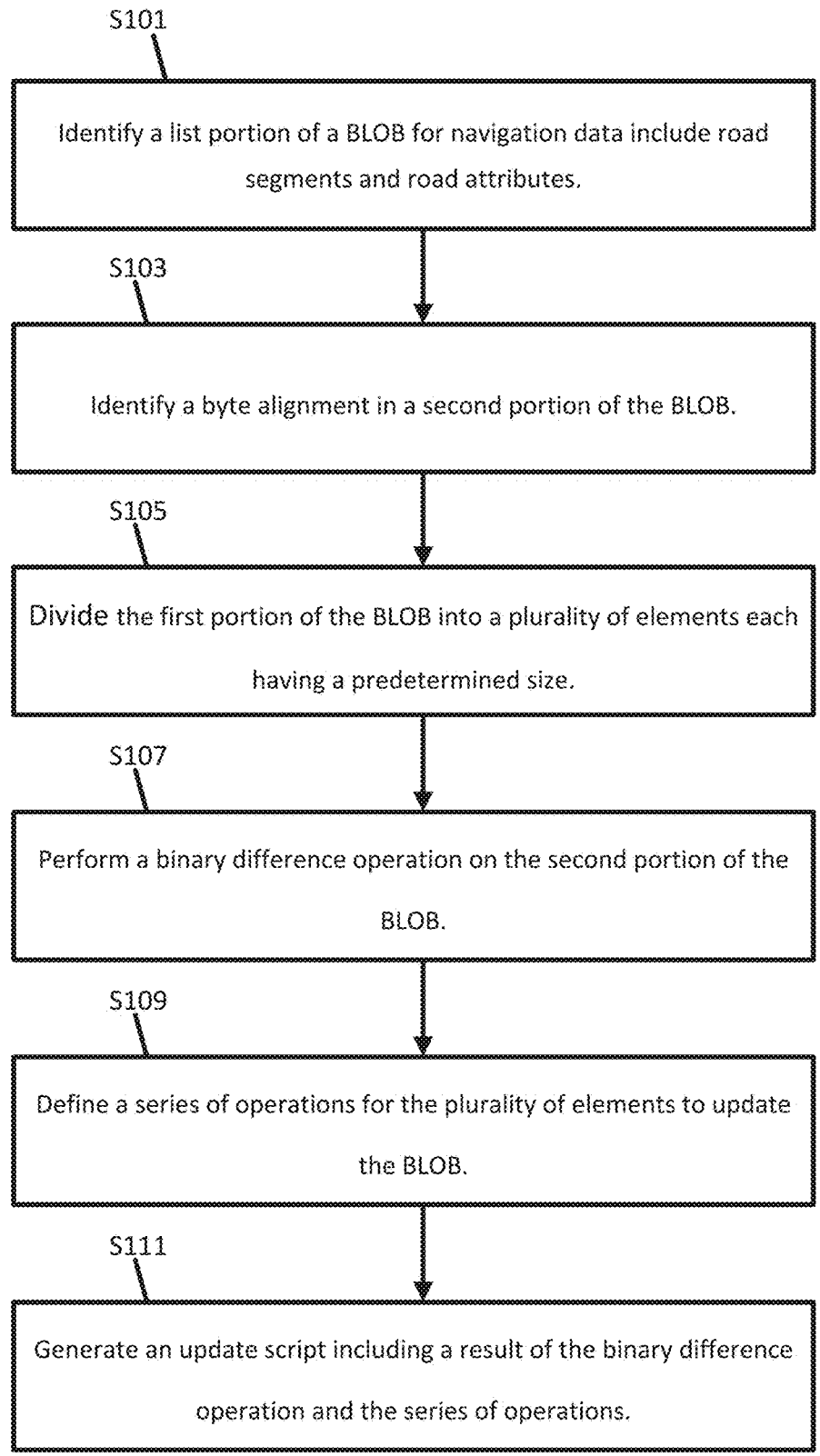
FIG. 12 illustrates an example flowchart for the server of FIG. 11.

FIG. 11 illustrates an example server 125. The server 125 includes a processor 300, a communication interface 305, and a memory 301. The server 125 may be coupled to a database 123 and a workstation 310. The workstation 310 may be used to enter data regarding the type of update script that will be used (e.g., binary difference versus series of element operations). The database 123 may be a geographic database as discussed above. Additional, different, or fewer components may be provided in the server 125. FIG. 12 illustrates an example flowchart for the operation of server 125. Additional, different, or fewer acts may be provided.

In act S101, the processor 300 identifies a list portion of a binary large object (BLOB) for navigation data include road segments and road attributes. The list portion may include byte misaligned data. The processor may analyze the BLOB in units (e.g., elements or lists) and compare each unit of the BLOB to a predetermined size. The predetermined size may be an integer number of bytes. When the units of the BLOB are not equal to an integer number of bytes or a modulus 8 of the number of bits is not equal to zero, the processor designates the first portion accordingly.

In act S103, the processor 300 identifies a byte alignment in a second portion of the BLOB. The byte alignment occurs because the second portion of the BLOB does have an integer number of bytes or a modulus 8 of the number of bits is equal to zero. In other words, the number of bits is a multiple of 8, and the second portion of the BLOB can be expressed in bytes. Thus, a hexadecimal representation of an old version of the second portion of the BLOB and a hexadecimal representation of a new version of the second portion of the BLOB can be compared using a binary difference and the result is a manageable size. The size of the result of the binary different approximates that size of the updated data.

In act S105, the processor 300 divides the first portion of the BLOB into a multiple elements each having a predetermined size. The predetermined size may be based on the organization of the data. The predetermined size may be defined based on a list of attributes or other geographic data.

In act S107, the processor 300 performs a binary difference operation on the second portion of the BLOB and corresponding portion of an existing version of the geographic database. Because the second portion of the BLOB is byte aligned. The binary difference of the second portion may include the updates in the second portion. In act S109, the processor 300 determines a series of operations for the first portion of the BLOB. The set of operations may include insert, delete, or update for the elements of the first portion of the BLOB.

In act S111, the processor 300 generates an update script including a result of the binary difference operation and the series of operations. The update script may also include the data for the updated elements, which are complex data structures, in line with the series of operations. The series of operations and binary difference may be stored as a navigational patch file. The update script may include dummy bits so that the update script itself includes an integer number of bytes.

Figure 13:
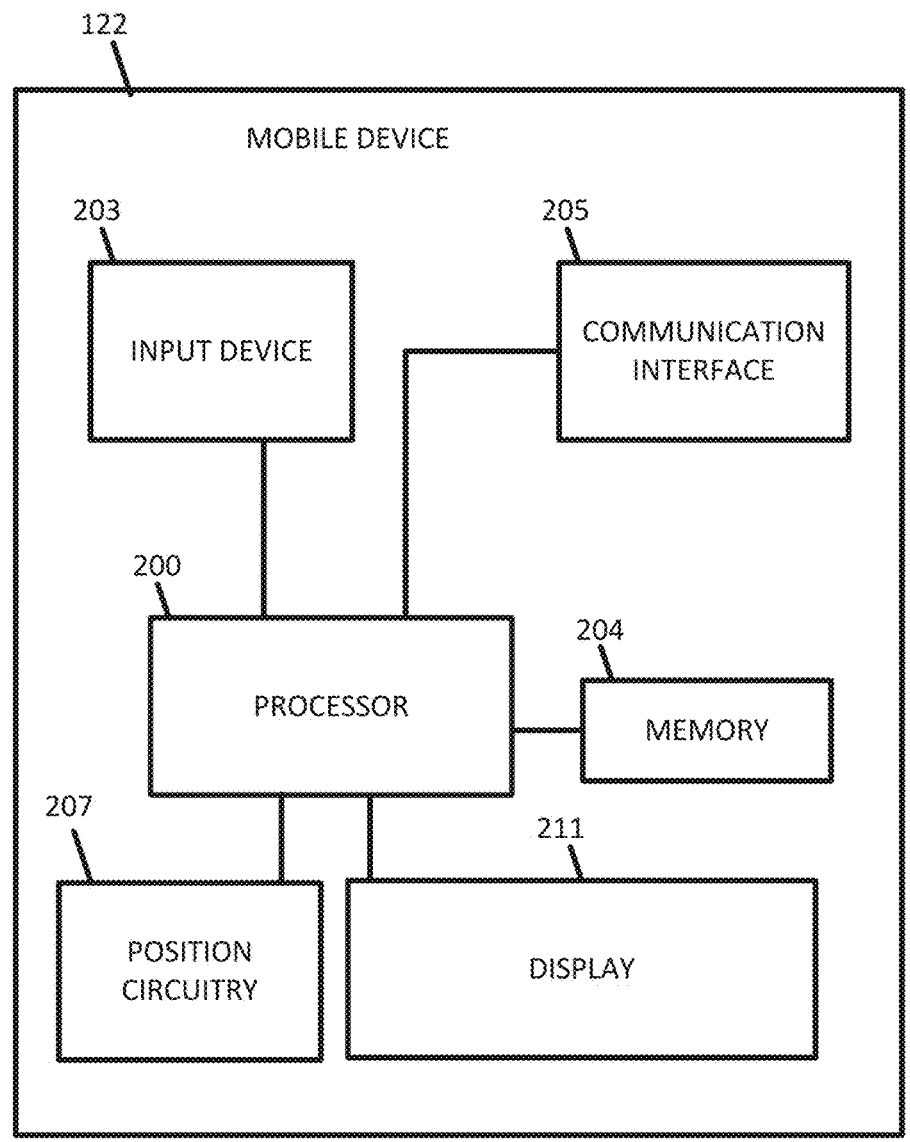
FIG. 13 illustrates an example mobile device in communication with the map developer system.

FIG. 13 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122.

The communication interface 205 may receive an update script or navigational path file from the server 125. The processor 200 executes the update script on a set of navigation data stored in memory 204. The set of navigation data may be an entire geographic database. The set of navigation data may be a subset of the geographic database. For example, the subset may be cached according to the geographic position of the mobile device 122. For example, the position circuitry 207 may determine the geographic position (e.g., latitude and longitude) and request the set of navigation data from the server 125 accordingly. In another example, the user may select a geographic region to be loaded in the memory 204.

The processor 200 unpacks the update script. The update script may include one type of update or one portion of the navigational data and another type of update on another portion of the navigational data. For example, for the first type of update the processor 200 may perform a byte replacement based on the result of the binary difference operation performed at the server 125. For the second type of operation, the processor 200 may perform insertions, deletions, and/or modifications on portion of the navigation data that are no byte sized or byte aligned.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    identifying, using a processor, a list portion of a first binary large object (BLOB) for navigation data, wherein the list portion includes byte misalignment data caused by a nonstandard number of bits in the list portion in the first BLOB for navigation data including road segments, road attributes, or map polygons, and wherein a second portion of the first BLOB has byte alignment data;
    dividing the list portion of the first BLOB into a plurality of elements each having a predetermined size;
    performing a binary difference on the second portion of the first BLOB and a corresponding portion of an existing version of a geographic database;
    defining a series of operations for the plurality of elements to transform the first BLOB to a second BLOB;
    generating an update script including a result of the binary difference and the series of operations; and
    transmitting the update script to a mobile device to facilitate execution on a set of navigation data.

2. The method of claim 1 wherein the nonstandard number of bits is indivisible by 8.

3. The method of claim 1, wherein the series of operations includes an insert operation, a delete operation, and a move operation.

4. The method of claim 1, further comprising:
    storing the series of operations along with a complex data structure in a datascript.

5. The method of claim 4, wherein the datascript is stored in a navigation patch file.

6. The method of claim 4, wherein the datascript includes an add command that adds dummy bits to the datascript.

7. The method of claim 1, further comprising:
    dividing the first BLOB into a first portion including byte misalignment data and the second portion having byte alignment data.

8. The method of claim 7, further comprising:
    sending an update for a navigation database including the result of the binary difference and the series of operations for the plurality of elements.

9. An apparatus comprising:
    at least one processor; and
    at least one memory including computer program code for one or more programs; the at least one memory and the computer program code configured to, with the at least one processor, cause the apparatus to at least perform:
    identify a list portion of a first binary large object (BLOB) for navigation data, wherein the list portion includes byte misalignment data caused by a nonstandard number of bits in the list portion in the first BLOB for navigation data including road segments and road attributes, and wherein a second portion of the first BLOB has byte alignment data;

divide the list portion of the first BLOB into a plurality of elements each having a predetermined size;

perform a binary difference on the second portion of the first BLOB and a corresponding portion of an existing version of a geographic database;

define a series of operations for the plurality of elements to transform the first BLOB to a second BLOB;

generate an update script including a result of the binary difference and the series of operations; and transmit the update script to a mobile device to facilitate execution on a set of navigation data.

10. The apparatus of claim 9, wherein the at least one memory and the computer program code configured to, with the at least one processor, cause the apparatus to at least perform:

divide the first BLOB into the list portion including byte misalignment data and the second portion having byte alignment data.

11. The apparatus of claim 9, wherein the nonstandard number of bits is a number not divisible by 8.

12. The apparatus of claim 9, wherein the series of operations includes an insert operation, a delete operation, and a move operation.

13. The apparatus of claim 9, wherein the series of operations are stored along with a complex data structure including geographic data in a datascript.

14. The apparatus of claim 13, wherein the datascript includes an add command that adds dummy bits to the datascript.

15. A non-transitory computer readable medium including instructions that when executed are configured to:

identify a list portion of a first binary large object (BLOB) for navigation data, wherein the list portion includes byte misalignment data caused by a nonstandard number of bits in the list portion in the first BLOB for navigation data including map polygons, road segments or road attributes, and wherein a second portion of the first BLOB has byte alignment data;

divide the list portion of the first BLOB into a plurality of elements each having a predetermined size;

perform a binary difference operation on the second portion of the first BLOB and a corresponding portion of an existing version of a geographic database;

define a series of operations for the plurality of elements to update the first BLOB to a second BLOB;

generate an update script including a result of the binary difference operation and the series of operations; and transmit the update script to a mobile device to facilitate execution on a set of navigation data.

16. The non-transitory computer readable medium of claim 15, wherein the list portion is caused by a number of bits that is not divisible by 8, and the second portion is caused by a number of bits that is divisible by 8.

17. The non-transitory computer readable medium of claim 15, wherein the series of operations includes an insert operation, a delete operation, and a move operation.

18. The non-transitory computer readable medium of claim 15, the instructions when executed are configured to:

determining a quantity of dummy bits to add to the update script.

* * * * *

UNITED STATES PATENT AND TRADEMARK OFFICE
CERTIFICATE OF CORRECTION

PATENT NO. : 9,798,740 B2
APPLICATION NO. : 14/584818
DATED : October 24, 2017
INVENTOR(S) : Pfeifle Page 1 of 1

It is certified that error appears in the above-identified patent and that said Letters Patent is hereby corrected as shown below:

On the Title Page

Item (71) Applicant, "Veldhoven (NL)" should read --Eindhoven (NL)--.

Signed and Sealed this
Twenty-fourth Day of April, 2018

Andrei Iancu
*Director of the United States Patent and Trademark Office*